United States Patent [19]

Puthuff

[11] Patent Number: 6,112,103

[45] Date of Patent: Aug. 29, 2000

[54] PERSONAL COMMUNICATION DEVICE

[76] Inventor: Steven H. Puthuff, 13001 Saratoga Sunnyvale Rd., Saratoga, Calif. 95070

[21] Appl. No.: 08/890,930

[22] Filed: Jul. 10, 1997

Related U.S. Application Data

[63] Continuation of application No. 08/758,365, Dec. 3, 1996.
[51] Int. Cl.[7] .......................................................... H04Q 7/32
[52] U.S. Cl. ............................ 455/557; 455/550; 455/563
[58] Field of Search .................................. 455/68, 69, 70, 455/90, 575, 403, 550, 563, 568, 569, 66, 557; 379/67.1, 88.01, 88.02, 90.01, 93.05, 93.07, 93.15, 110.01; 381/312, 314, 315, 316, 330, 328; 704/275

[56] References Cited

U.S. PATENT DOCUMENTS

| | | |
|---|---|---|
| 4,882,761 | 11/1989 | Waldhauer . |
| 4,882,762 | 11/1989 | Waldhauer . |
| 4,949,374 | 8/1990 | Ishii et al. ................................. 455/563 |
| 4,975,654 | 12/1990 | Becker et al. . |
| 5,140,640 | 8/1992 | Graupe et al. . |
| 5,278,912 | 1/1994 | Waldhauer . |
| 5,353,376 | 10/1994 | Oh et al. .................................... 381/46 |
| 5,363,444 | 11/1994 | Norris ..................................... 379/430 |
| 5,390,254 | 2/1995 | Adelman . |
| 5,452,361 | 9/1995 | Jones . |
| 5,479,522 | 12/1995 | Lindemann et al. . |
| 5,488,668 | 1/1996 | Waldhauer . |
| 5,590,417 | 12/1996 | Rydbeck ................................... 455/90 |
| 5,751,820 | 5/1998 | Taenzer .................................... 455/66 |
| 5,983,100 | 9/1996 | Johansson ............................... 455/426 |
| 6,021,207 | 3/1997 | Puthuff et al. .......................... 455/575 |

FOREIGN PATENT DOCUMENTS

4321304 A1   3/1995   Germany ......................... H04Q 9/00

*Primary Examiner*—William G. Trost
*Assistant Examiner*—Jean A. Gelin
*Attorney, Agent, or Firm*—Burns Doane Swecker & Mathis L.L.P.

[57] ABSTRACT

A communication system provides two-way wireless communication between a user and at least one remote device. The communication system comprises at least one earpiece worn by the user and a personal communication device for receiving and transmitting signals over a wireless link to and from the earpiece. The personal communication device includes voice recognition circuitry which recognizes and interprets voice commands of the user. The personal communication device is configured to determine a remote device to receive each of the voice commands, and transmits the appropriate voice commands to the remote device, accordingly.

6 Claims, 6 Drawing Sheets

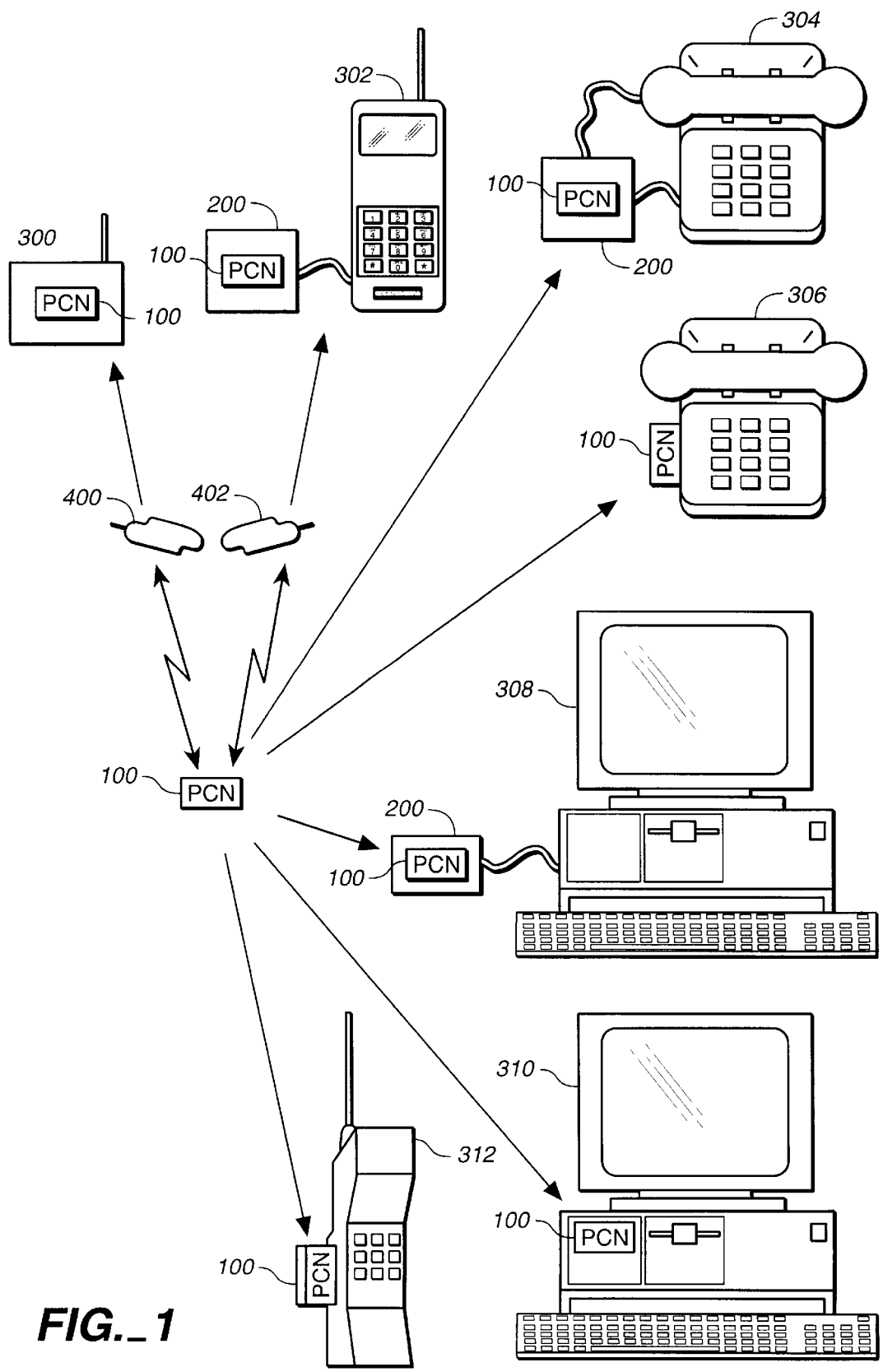
FIG._1

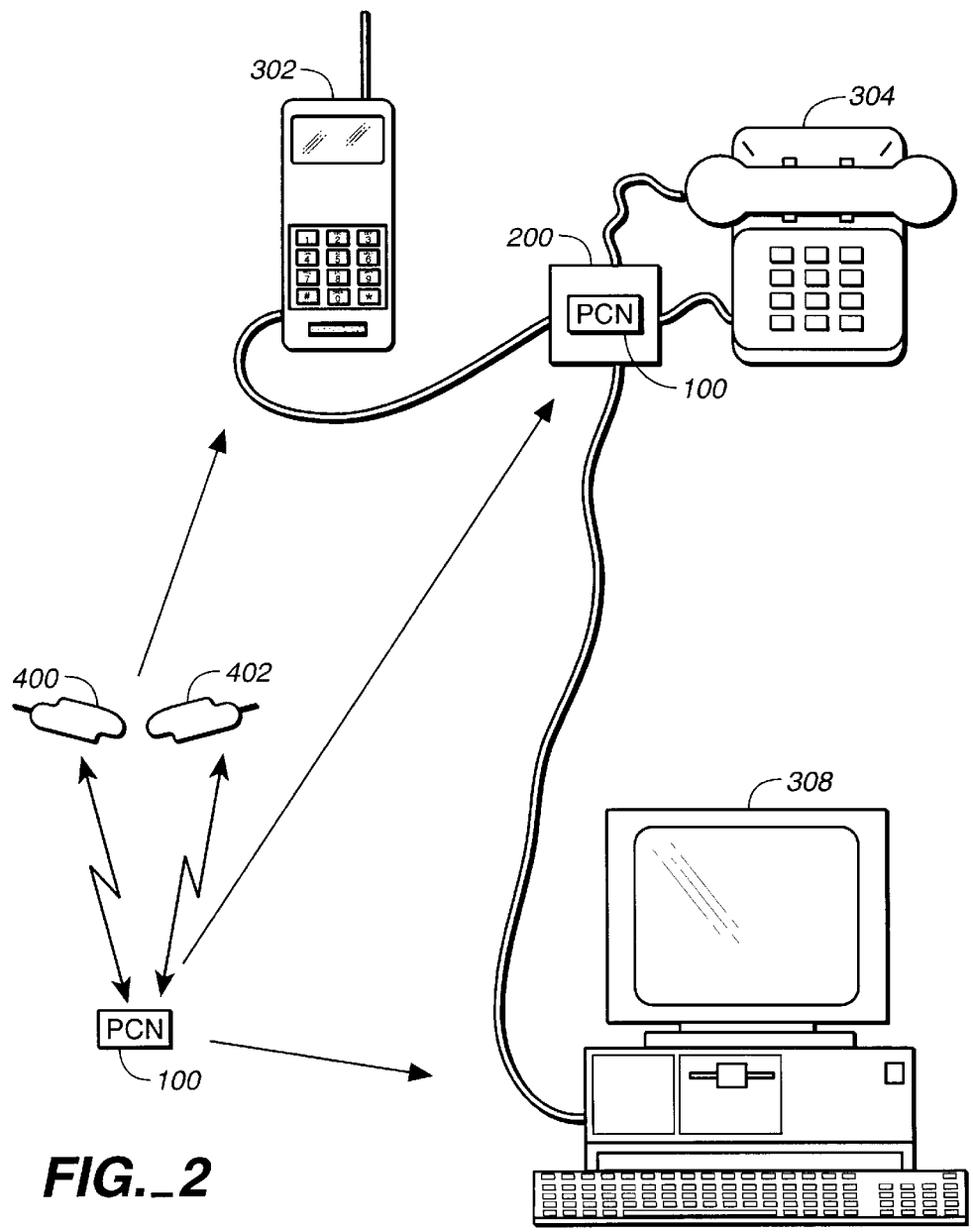
FIG._2

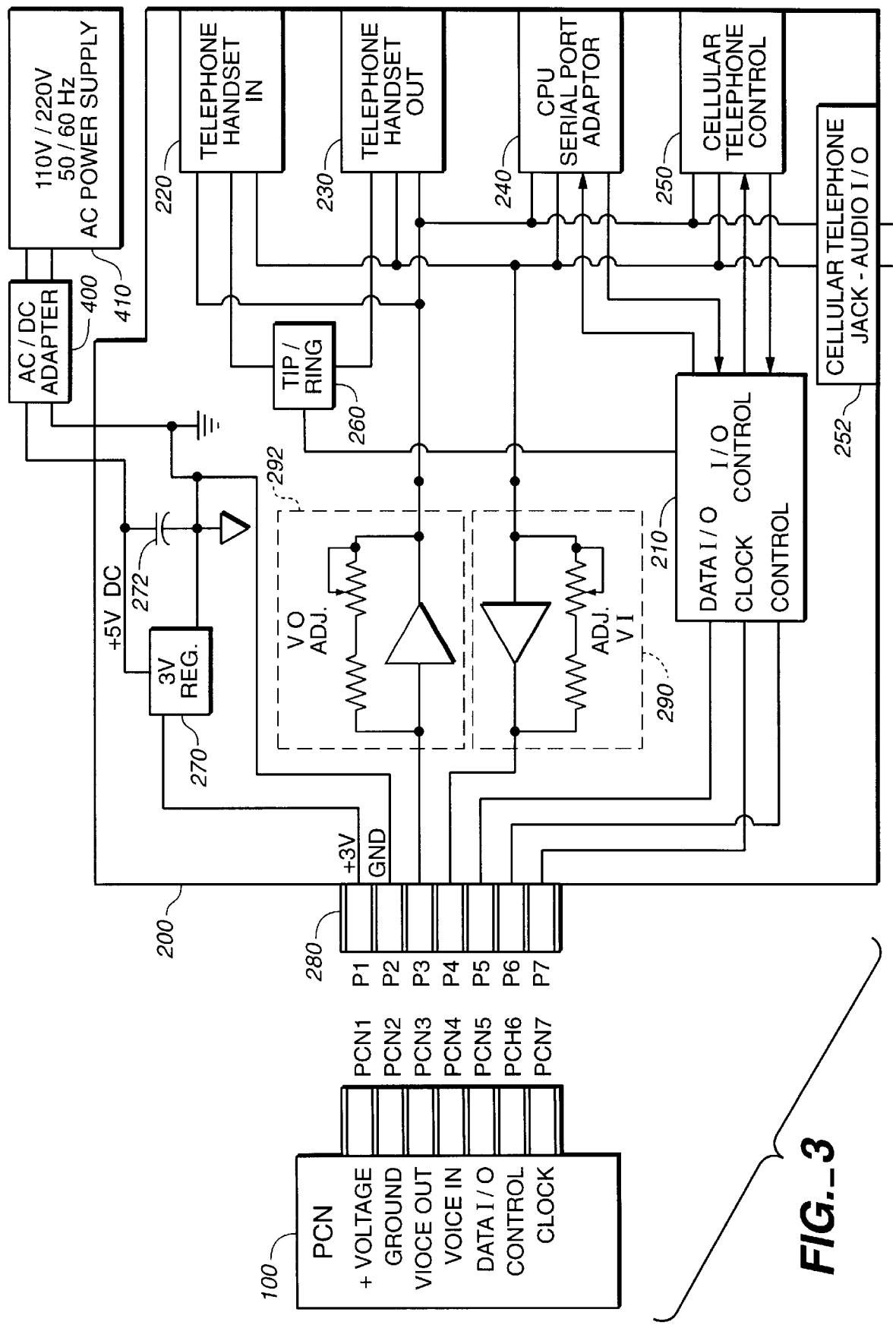
FIG._3

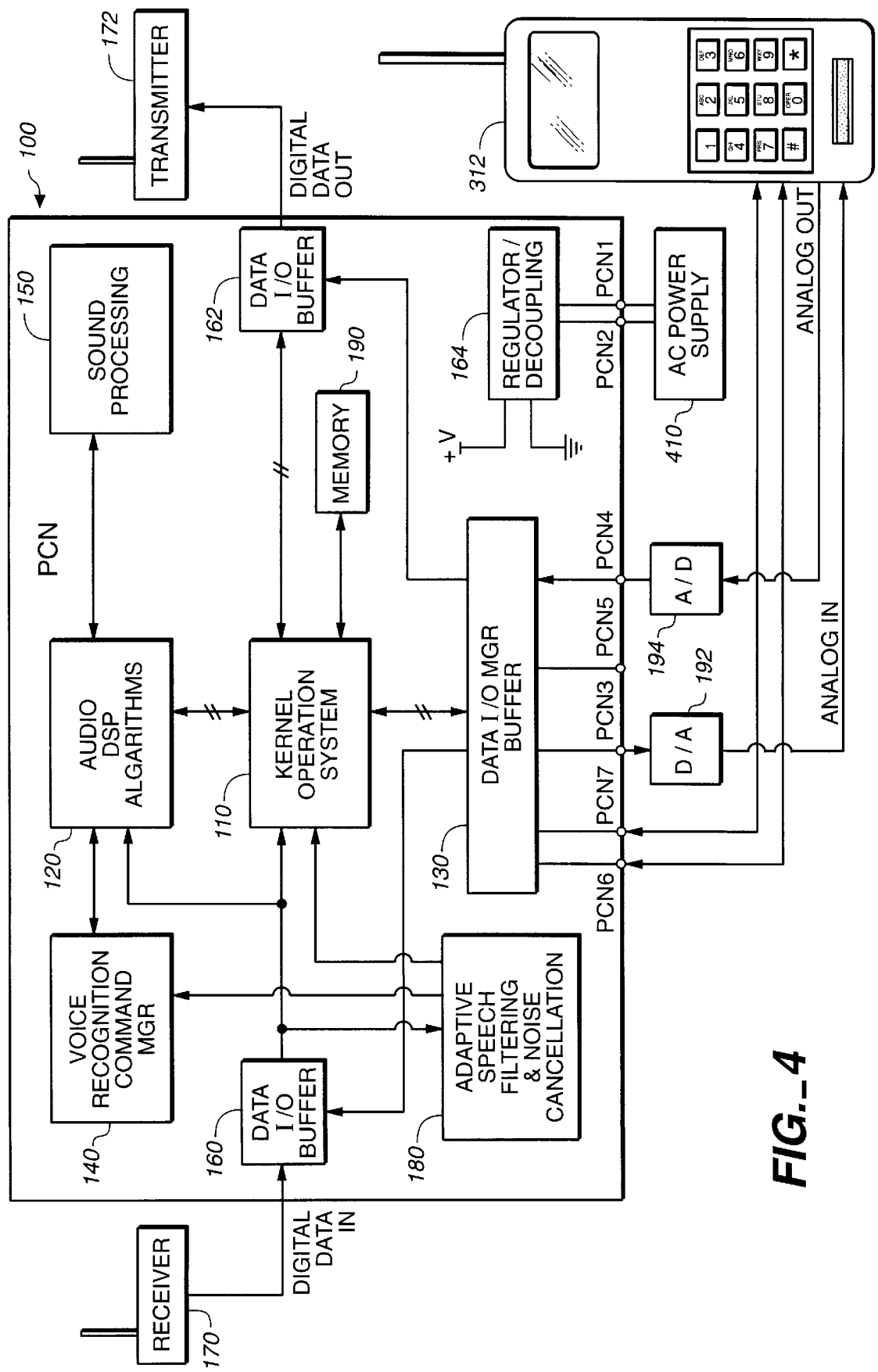
FIG._4

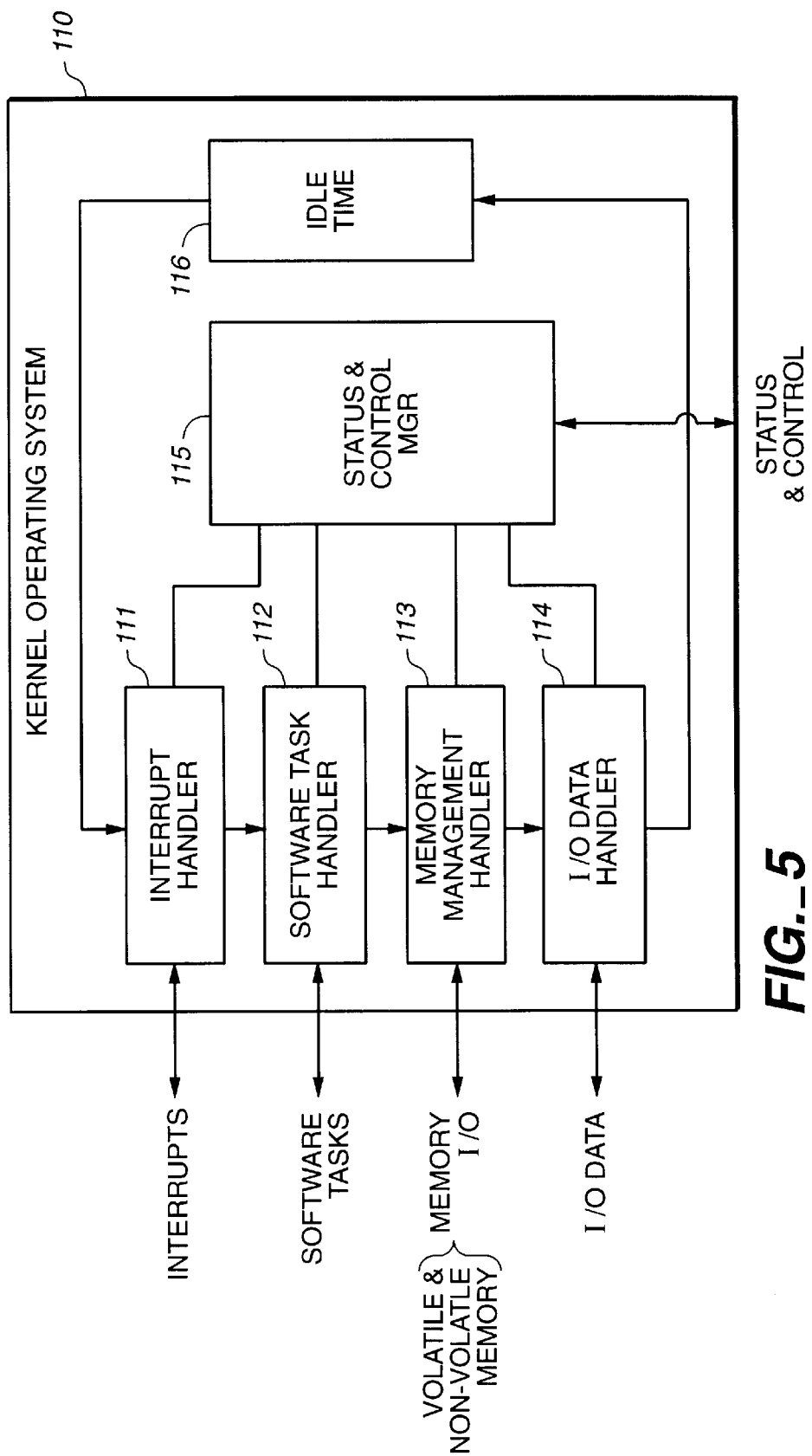
FIG._5

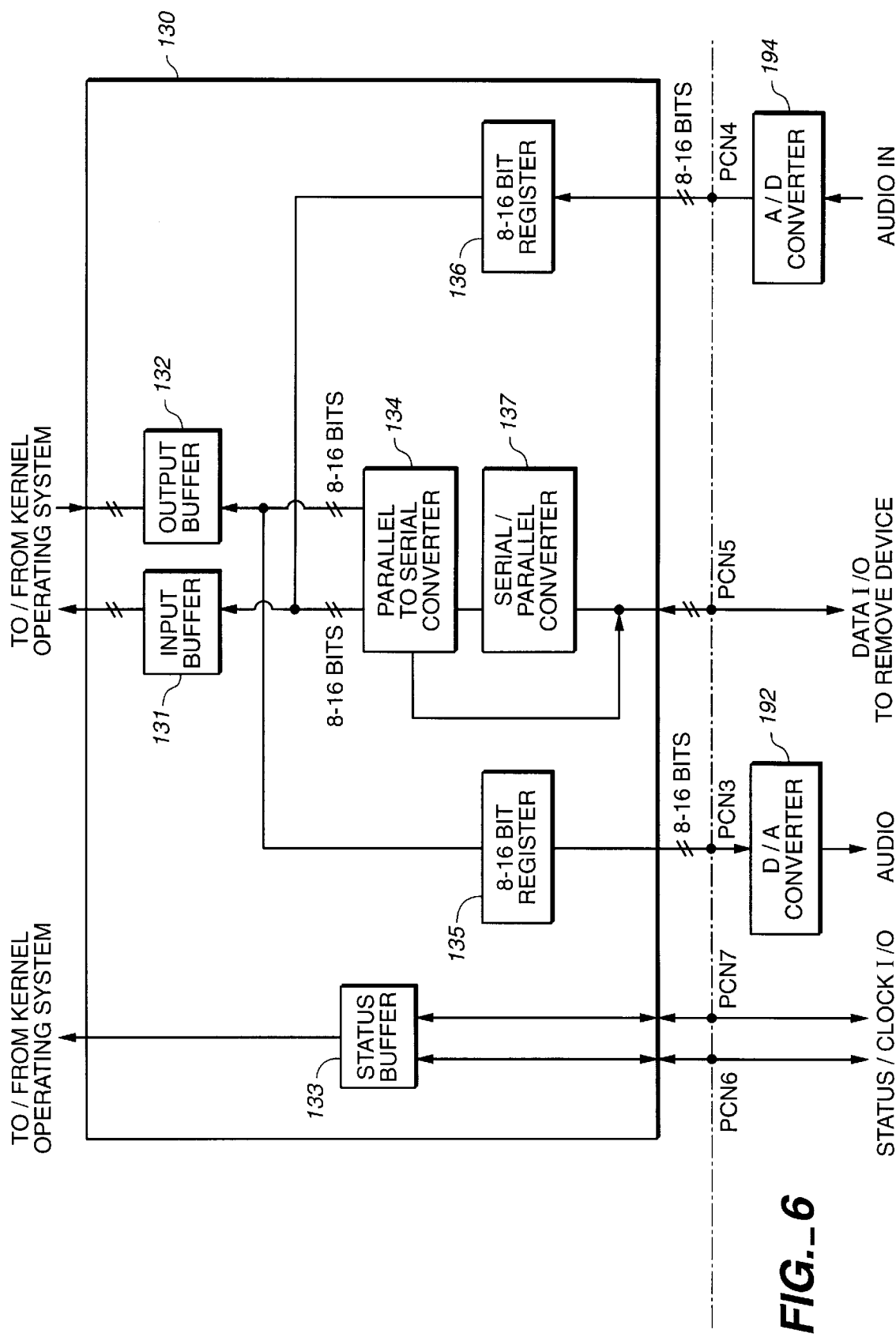
FIG._6

PERSONAL COMMUNICATION DEVICE

The present application is a continuation of U.S. application Ser. No. 08/758,365, filed Dec. 3, 1996, and entitled "PERSONAL COMMUNICATION DEVICE", the priority of which is hereby claimed under 35 U.S.C. §120.

BACKGROUND OF THE INVENTION

1. Field of the Invention

The present invention is directed to a communication system for two-way wireless communication. More particularly, the present invention is directed to a communication system including a personal communication device which is universally adaptable to at least one remote device for two-way wireless communication between a user and the remote device.

2. State of the Art

Two-way wireless communication systems are well known. For example, one known two-way wireless communication system is described in copending U.S. patent application Ser. No. 08/479,629, filed on Jun. 7, 1995 in the name of Jim Anderson, and entitled "Hearing Aid With Wireless Remote Processor", the contents of which are herein incorporated by reference in their entirety. In this system, audio signals are picked up by a microphone in an earpiece worn by a user, transmitted over a wireless link to a remote processor in which they can be processed to enhance the signal quality and then: (1) returned to the earpiece for output to the wearer; or (2) processed for transmission to a secondary unit (e.g., a cellular phone network). In a similar manner, signals from the secondary unit can be received by the remote processor, processed, and then transmitted to the earpiece.

A problem with this known system is that it is not universally adaptable to any type of secondary unit. Connecting a particular secondary unit to the remote processor requires special adaptation circuitry. This makes it prohibitively expensive and complex to connect the remote processor to many different types of secondary units.

Thus, there is a need for a communication system which permits two-way wireless communication between a user and at least one remote device which is universally adaptable to a variety of remote devices, and which can be connected to a single remote device or to a plurality of different remote devices at the same time or at different times in a simple manner.

SUMMARY OF THE INVENTION

The present invention is directed to a two-way wireless communication system between a user and at least one remote device which is universally adaptable to a variety of remote devices. Further, the present invention is directed to a two-way wireless communication system between a user and a plurality of remote devices which can be connected to the plurality of remote devices at the same time or at different times in a simple manner. In addition, the present invention is directed to a two-way wireless communication system between a user and at least one remote device which enables the user to control the remote device and/or to communicate with a third party via the remote device.

According to exemplary embodiments of the present invention, the foregoing objects, as well as other objects are met by a communication system comprising at least one earpiece worn by a user and a personal communication device for receiving and transmitting signals over a wireless link to and from the earpiece. The personal communication device includes voice recognition means which recognizes and interprets voice commands of the user. The personal communication device is configured to determine a remote device which is to receive each of the voice commands. The voice commands are used to control the remote device, and the user can communicate with a third party via the remote device.

According to one embodiment of the present invention, the personal communication device is connected to one remote device at a time, either directly or via an adaptor. The adaptor universally connects the personal communication device to a variety of remote devices. The personal communication device is configured to determine voice commands that are to be sent to the remote device and sends these commands to the remote device, accordingly.

According to a second embodiment of the present invention, the personal communication device is connected to a plurality of remote devices at the same time or at different times, via, for example, a universal adaptor. The personal communication device is configured to determine which remote device the voice commands are to be sent to, and sends the commands to the appropriate remote device, accordingly.

BRIEF DESCRIPTION OF THE DRAWINGS

The objects and advantages of the present invention will be understood by reading the following detailed description in conjunction with the drawings, wherein like elements are identified by like reference numbers, and wherein:

FIG. 1 illustrates a communication system according to a first embodiment of the present invention;

FIG. 2 illustrates a communication system according to a second embodiment of the present invention;

FIG. 3 illustrates in detail an exemplary universal adapter which can be implemented in the communication system shown in FIGS. 1 and 2;

FIG. 4 illustrates a personal communication device which can be implemented in the communication system shown in FIGS. 1 and 2;

FIG. 5 illustrates in detail an exemplary Kernel Operating System which can be implemented in the personal communication device shown in FIG. 4; and FIG. 6 illustrates in detail an exemplary Data I/O Manager Buffer which can be implemented in the personal communication device shown in FIG. 4.

DETAILED DESCRIPTION OF THE PREFERRED EMBODIMENTS

FIG. 1 illustrates a communication system according to one embodiment of the present invention. Referring to FIG. 1, a personal communication device, referred to as a personal communication node (PCN) 100, is connected via wireless links to earpieces 400 and 402 worn by a user. The wireless links can, for example, be radio frequency links such as that described in the above-referenced U.S. patent application Ser. No. 08/479,629. Further, the earpieces 400 and 402 can, for example, be configured as described in the aforementioned copending U.S. patent application. Although two earpieces are shown and can be worn by the user, one skilled in the art will appreciate that it may be desirable for the user to wear only one earpiece.

The PCN 100 permits a user to control at least one remote device and communicate wirelessly with a third party via the remote device simply by issuing voice commands. The PCN 100 recognizes and interprets the voice commands of the user, determines whether the commands are to be sent to a given remote device to which it is connected, and forwards the voice commands to the appropriate remote device, accordingly. As shown by the arrows in FIG. 1, the PCN 100 can be coupled to several different types of remote devices, either directly or through a universal adapter 200.

For example, the PCN 100 can be connected directly to a cellular telephone 300 that is adapted for connection to the PCN. As shown in FIG. 1, the cellular telephone 300 has no keyboard or LED display and is instead controlled solely by voice commands from the user as described in more detail below. Alternately, the PCN 100 can be connected to a cellular telephone or pager 302 via an adapter 200. FIG. 1 also shows the PCN 100 connected directly to a cellular phone 312 that is adapted for connection to the PCN 100. The cellular phone 312 can be used in a normal manner by entering commands via a keyboard or in response to voice commands forwarded by the PCN 100. Using the PCN 100 connected to the cellular telephones 300, 302, and/or 312 the user can answer calls, initiate calls, receive or send messages, and so on, simply by issuing voice commands.

The PCN 100 can also be connected via the adapter 200 to a fixed wireline telephone 304. The adapter 200 is connected between the handset of the telephone 304 and the telephone body. Alternately, the PCN 100 can be connected directly to a fixed wireline telephone 306 that is adapted to be connected to the PCN. With the PCN 100 connected to the fixed wireline telephones 304 or 306, the user controls the TIP and RING functions of the telephone to dial a number to initiate a call or to answer a call, respectively, simply by issuing voice commands.

The PCN 100 can also be connected to a personal computer 308 via the adapter 200 through a parallel or serial port on the personal computer 308. Alternately, the PCN 100 can be connected directly to a personal computer 310 that includes I/O jacks for connection to the PCN. With the PCN 100 connected either directly or via the adapter 200, the user can use the personal computers 308 and 310 for Internet applications, to update schedules, to input data, to control calls, to dictate information, for intelligent applications, and so on, simply by issuing voice commands.

FIG. 2 illustrates a communication system according to a second embodiment of the present invention. As in FIG. 1, the PCN 100 is connected via wireless links to earpieces 400 and 402 worn by a user. In FIG. 2, however, the PCN 100 is connected to a plurality of different remote devices at the same time or at different times through a universal adapter 200. For example, as shown in FIG. 2, the PCN 100 can be connected to a cellular telephone 302, a fixed wireline telephone 304, and a personal computer 308 at the same time or at different times via the universal adapter 200. The connection of the adapter 200 to these remote devices is the same as that described above with reference to FIG. 1. The PCN 100 shown in FIG. 2 is configured to determine which of the remote devices a voice command is to be sent to and forwards the voice command to the appropriate device, accordingly. This is described in more detail below.

Although FIGS. 1 and 2 show the PCN 100 connected to remote devices directly or through an adapter 200, the PCN 100 can also be connected to the remote devices directly or through an adapter 200 via another device such as a LAN, a bidirectional FM device, or an infrared device. Such devices extend the distance through which the PCN 100 can communicate with or control remote devices. In addition, although the PCN 100 and the adapter 200 are shown in FIGS. 1 and 2 as separate devices, they can be incorporated into a single device.

FIG. 3 illustrates in detail an exemplary universal adapter which can be implemented in the communication system shown in FIGS. 1 and 2. The universal adapter 200 is connected to the PCN 100 via a connector 280. The connector 280 includes ports P1–P7 connected to respective ports PCN1–PCN7 of the PCN 100. For example, port P1 is connected to a positive voltage port PCN1, port P2 is connected to a ground port PCN2, port P3 is connected to a voice out port PCN3, port P4 is connected to a voice in port PCN4, port P5 is connected to a data I/O port PCN5, port P6 is connected to a control port PCN6, and port P7 is connected to a clock port PCN7. Remote devices configured for connection directly to the PCN 100 are connected through the ports PCN1–PCN7 of the PCN 100.

The universal adapter 200 also includes various ports for connection to remote devices. For example, the universal adapter 200 includes ports 220 and 230 for connection to a telephone handset IN and OUT. These ports can include, for example, standard RJ-11 connectors. The universal adapter 200 also includes a Serial Adapter port 240 for connection to a serial port of a CPU, and ports 250 and 252 for connection to cellular telephone control and a cellular telephone audio I/O jack, respectively.

The universal adapter 200 includes an I/O Control Unit 210 for controlling the flow of data and control signals through the adapter between the PCN 100 and the remote devices in response to, for example, voice commands received via connector 280. Control and clock signals for the CPU received via PCN ports P6 and P7 are transferred under the control of the I/O Control Unit 210 directly to the CPU via the Serial Adapter port 240. Control and clock signals for the telephone handset are transmitted from the I/O Control Unit 210 to the TIP/RING Unit 260 which controls the TIP/RING functions of the telephone handset in response to, for example, voice commands received via connector 280. Control and clock signals for the cellular telephone are also transmitted from the I/O Control Unit 210 to the cellular telephone via the port 250.

The universal adapter 200 receives and transmits digital data from and to the PCN 100 via the ports PCN5 and P5. Digital data is transmitted to and received from the CPU via the I/O control unit 210 and the Serial Adapter port 240.

The universal adapter 200 receives digital voice information from the PCN 100 via the ports PCN3 and P3 and transmits digital voice information from a remote device to the PCN 100 via the ports P4 and PCN4. Voice data received at port P3 is processed in a voice output circuitry 292 (e.g., an analog operational amplifier with adjustable feedback resistance) and transmitted to the cellular phone via the audio I/O jack 252, to the telephone handset via the port 230, and/or to the CPU via the Serial Adapter port 240. Voice data received from the cellular phone via audio I/O jack 252, from the telephone handset via the port 220, and from the CPU via the Serial Adapter port 240 is processed by the voice input circuitry 290 (i.e., similar to the voice output circuitry), and delivered to the PCN 100.

According to an exemplary embodiment, the universal adapter 200 need not include an internal power supply, but rather can be connected to an external AC power supply 410 via an AC/DC Adapter 400. The universal adapter 200 includes a voltage regulator 270 and a decoupling capacitor 272 for this purpose. The voltage regulator 270 regulates voltage supplied to the PCN 100 via the ports P1 and PCN1. In the case of a PCN 100 connected directly to a remote device, the voltage regulator 270 and decoupling capacitor 272 can be included in the PCN 100, as shown in FIG. 4 below.

FIG. 4 illustrates a personal communication node according to an exemplary embodiment of the present invention. For illustrative purposes, the PCN 100 is depicted in FIG. 4 as connected to a single remote device, the cellular telephone 312, adapted for connection directly to the PCN 100.

Referring to FIG. 4, the PCN 100 processes signals received via the earpiece(s) worn by the user, including voice commands to control the cellular telephone 312 as well as voice data to be conducted over the cellular telephone network, and transmits appropriate signals to the cellular telephone 312. The PCN 100 also processes signals from the telephone 312 and transmits these signals to the earpiece(s). To perform these functions, the PCN 100 includes a Kernel Operating System 110, an Audio Digital Signal Processing (DSP) Algorithms Unit 120, a Data Input/Output (I/O) Manager (Mgr) Buffer 130, a Voice Recognition Command Manager 140, a Sound Processing System 150, Data I/O Buffers 160 and 162, an Adaptive Speech Filtering and Noise Cancellation Unit 180, and a Memory Unit 190.

The Kernel Operating System 110 includes software for scheduling software tasks, handling interrupt requests, scheduling data input/output, and allocating memory for various applications in the PCN 100. FIG. 5 illustrates in detail an exemplary Kernel Operating System which can be implemented in the personal communication device shown in FIG. 4. A Status and Control Manager (Mgr) 115 of the Kernel Operating System 110 handles status (clock) and control information received from and transmitted to the Data I/O Mgr Buffer 130. Scheduling of data input/output from various elements in the PCN 100 is handled by the FIG. 5 I/O Data Handler 114 under the control of the Status and Control Mgr 115. The Memory Management Handler 113 allocates memory from the Memory Unit 190 for various tasks in the PCN 100 under the control the Status and Control Mgr 115. Memory is allocated and data I/O is scheduled according to software task and interrupt requests.

Software task requests from various elements in the PCN 100, such as the FIG. 4 Audio DSP Algorithms Unit 120, are handled by the FIG. 5 Software Task Handler 112. The Software Task Handler 112 issues software task instructions under the control of the Status and Control Mgr 115.

Interrupt requests from various elements in the PCN 100, such as the FIG. 4 Data I/O Mgr Buffer 130 and the Audio DSP Algorithms Unit 120, are handled by the FIG. 5 Interrupt Handler 111, which issues interrupt instructions under the control of the Status and Control Mgr 115. The Interrupt Handler 111 includes a prioritized list of applications, which indicates which applications can interrupt other applications. As those skilled in the art will appreciate, this list can be selectively prioritized in any manner desired by the user. For example, the Interrupt Handler 111 can assign higher priority to incoming data from a CPU than to processing of an ongoing telephone call (or vice versa). Thus, when the Interrupt Handler 111 receives a request to interrupt from the FIG. 4 Data I/O Mgr Buffer 130 based on receipt of data from the CPU, the Interrupt Handler responds by interrupting operation of the Sound Processor 150. The Interrupt Handler 111 bases interrupt instructions on idle time reports from the Idle Time Unit 116, and does not issue interrupt instructions if the reports indicate that the PCN 100 is idle. The Idle Time Unit 116 bases the idle time reports on information from the I/O Data Handler 114 which indicates the schedule of data I/O at a given time.

Referring again to FIG. 4, the Sound Processing Unit 150 includes basic software used, for example, in a hearing aid to enhance signal quality. The Sound Processing Unit 150 can be implemented with a remote processor such as that described in the above-referenced copending U.S. patent application Ser. No. 08/479,629.

The Voice Recognition Command Manager 140 includes software which interprets voice commands from the user. For example, a voice command can be interpreted as a command to direct the cellular telephone 312 of FIG. 4 to perform a certain function. The Voice Recognition Command Manager 140 can be implemented with any conventional voice recognition software, such as Motorola's Lexicus Microbrain or the Voice Dialer, Model VCS 2060 of Voice Control Systems Inc. in Dallas, Tex. The Voice Recognition Command Manager 140 is "trained" ahead of time during a set up phase to recognize the voice of a specific user. For example, the user simply speaks a series of selected words, and the Voice Recognition Command Manager 140 becomes programmed (i.e., trained) in known fashion to recognize any word spoken by the user based on these selected words. The Voice Recognition Command Manager 140 can, for example, be language-independent. That is, it can be trained to recognize a user's voice in any language. Once the Voice Recognition Command Manager 140 is trained to the voice of the user, it need not be trained again.

The Voice Command Manager 140 matches a voice command to a particular control function in a library or look-up table of memory 190. The voice command is also matched, via the look-up table, to a particular remote device. After matching the voice command to a particular control function and a particular remote device, the Voice Recognition Command Manager 140 then issues an appropriate control code to, for example, control gating of commands and/or data to one or more remote devices via the FIG. 4 Kernal Operating System and, where the adapter 200 is used, the FIG. 3 I/O control 210. If the voice command does not match a control function in the library or look-up table, no control code is issued. Also, if the voice command corresponds to a remote device to which the PCN 100 is not connected, no control code is issued.

The Audio DSP Algorithms Unit 120 provides digital sound processing algorithms for the Voice Recognition Command Mgr 140 and the Sound Processing Unit 150 under the control of the Kernel Operating System 110. The Audio DSP Algorithms Unit 120 can be implemented in accordance with features described in U.S. Pat. No. 5,479, 522 (Lindemann et al.), the contents of which are hereby incorporated by reference in their entirety.

The Data I/O Mgr Buffer 130 temporarily stores data, voice, and control signals. FIG. 6 illustrates in detail an exemplary Data I/O Manager Buffer which can be implemented in the personal communication node shown in FIG. 4. The Data I/O Mgr Buffer 130 includes input and output buffers 131 and 132 for outputting and receiving, respectively, digital data, digital voice information, and clock and control signals to and from the Kernel Operating System 110. Digital data from the Output Buffer 132 is converted into serial form in a Parallel to Serial Converter 134 and delivered to the remote device via the port PCN5. Digital data from the remote device is converted into parallel form in the Serial to Parallel converter 137 and delivered to the Kernel Operating System 110 via the Input Buffer 131. The digital voice data is transmitted across, for example, 8 to 16 bit buses. Digital voice data is delivered from the Output Buffer 132 to an 8 to 16 bit register 135, converted into analog form in the D/A converter 192, and transmitted to the remote device. Digital voice data received from the remote device is converted into digital form in the A/D converter 194, stored in the 8 to 16 bit register 136, and delivered to the Input Buffer 131 for output to the Kernel Operating System 110. The Data I/O Mgr Buffer 130 also includes a Status Buffer 133 for storing clock and control information transferred between the Kernel Operating System 110 and the remote device.

Referring again to FIG. 4, the personal communication device also includes an Adaptive Speech Filtering and Noise Cancellation Unit 180 which enhances signal quality by filtering and cancelling noise in the signal. The Adaptive Speech Filtering and Noise Cancellation Unit 180 can be implemented in accordance with, for example, U.S. Pat. No. 5,140,640 (Graupe et al.) and/or U.S. Pat. No. 5,452,361 (Jones) entitled "Reduced VLF Overload Susceptibility Active Noise Cancellation Headset" assigned to Noise Cancellation Technology (NCT), the contents of which are hereby incorporated by reference in their entireties.

In the exemplary embodiment illustrated, the PCN 100 need not include a power supply, but rather can be connected to an external AC power supply 410 via a voltage regulator and decoupling unit 164. Although shown as a separate element, the AC power supply 410 can, for example, be the same power supply used to power the cellular telephone 312. The voltage regulator and decoupling unit 164 can include the voltage regulator 270 and the decoupling capacitor 272 shown in FIG. 3. Power is supplied from the external power supply and regulated by the voltage regulator and decoupling unit 164 in the same manner described above with reference to FIG. 3.

In an exemplary embodiment, the PCN 100 communicates wirelessly with the earpiece(s), although wired communication can of course be used. In the FIG. 4 embodiment, the PCN 100 receives signals from the earpieces via the Receiver 170 and stores the signals in a Data I/O Buffer 160, and the PCN 100 transmits signals to the earpiece(s) after being stored in the Data I/O buffer 162 via the Transmitter 172. Signals are converted into analog form and forwarded to the cellular telephone 312 via the D/A converter 192. Signals are received from the cellular telephone 312 and converted into digital form in the A/D Converter 194. The Data I/O Buffers 160 and 162, the Receiver 170, the Transmitter 172, and the converters 192 and 194 can be implemented with any suitable conventional devices.

According to an exemplary embodiment, the PCN device 100 operates in the following manner. When the cellular telephone 312 rings to indicate an incoming call, the ring signal can be transmitted directly to the user, for example via the microphone in the earpiece(s), or transmitted to the user via the PCN 100 and the earpiece(s). If the ring signal is an audible signal, the user can, of course, respond to it by commanding that the telephone be picked up. However, if the user has a hearing impairment, the audible ring signal can be transmitted via the earpiece microphone and speaker. That is, the audible ring of the telephone can be detected by the earpiece(s) and passed to the user (e.g., a hearing impaired user) after signal enhancement is performed by the PCN 100. Alternately, if the ring signal is a non-audible signal, it can be transmitted by the PCN 100 to the earpiece. In such a case, the analog ring signal is converted into digital form in the A/D converter 194 and forwarded to the Data I/O Manager Buffer 130 which temporarily stores the ring signal.

The Data I/O Mgr Buffer 130 forwards the ring signal to the Audio DSP Algorithms Unit 120 and the Sound Processing Unit 150 via the Kernel Operating System 110. The Sound Processing Unit 150 processes the ring signal to enhance its signal quality according to the Audio DSP Algorithms Unit 120 under the control of the Kernel Operating System 110.

The processed ring signal is forwarded from the Sound Processing Unit 150 to the Data I/O Buffer 162 via the Kernel Operating System 110. The Data I/O Buffer 162 delivers the processed ring signal to the Transmitter 172 which transmits the ring signal to the earpiece(s) worn by the user.

When the user hears the ring signal, either directly or through the earpiece(s), he or she simply commands the telephone 312 to go off-hook by issuing a voice command, such as "Pick-up cellular phone". This voice command is picked up by microphone(s) in the earpiece(s) and transmitted across the wireless link(s) to the Receiver 170. The Receiver 170 forwards the voice command in digital form to the Kernel Operating System 110 via the Data I/O Buffer 160. The voice command is also forwarded to the Adaptive Speech Filtering and Noise Cancellation Unit 180 which filters and cancels noise in the voice command and then forwards the voice command to the Voice Recognition Command Manager 140.

The Voice Recognition Command Manager 140 matches the voice command to a particular control code and a particular remote device and forwards the control code to the Kernel Operating System 110 via the Audio DSP Algorithms Unit 120. The Kernel Operating System 110 forwards the control code to the Data I/O Mgr Buffer 130 which, in turn, forwards the control code to the cellular telephone 312 via the port PCN6. For a plurality of remote devices connected to the PCN 100, the control code is forwarded to the appropriate remote device from the Data I/O Mgr Buffer 130 and, where the FIG. 3 adapter 200 is used, via the I/O control 210. The cellular telephone 312 recognizes the control code as a command to go off-hook and responds accordingly. In this manner, the voice command issued by the user causes the cellular telephone 312 to go off-hook.

The user can then begin a typical conversation on the telephone network by speaking normally. The user's voice is picked up by the microphone(s) in the earpiece(s), transmitted over the radio link to the Receiver 170, and processed by the PCN 100 in the same manner as described above for the voice command, except that the voice information is processed by the Sound Processing Unit 150 according to the Audio DSP Algorithms before being forwarded to the Kernel Operating System 110, and the voice information is delivered to the D/A converter 192 from the port PCN3 for conversion into analog form before being delivered to the cellular telephone 312. Voice information and/or data from a third party caller is picked up by the cellular telephone 312, converted into digital form by the A/D converter 194, received at the port PCN4 and processed in the PCN 100, and transmitted wirelessly to the speaker(s) in the earpiece (s) via the Transmitter 172 in the same manner described above for the ring signal.

When the user wants to terminate the call, he or she merely issues a voice command such as "Hang up". This voice command is transmitted to the PCN 100 and interpreted by the Voice Recognition Manager 140 as a command to terminate the call, and an appropriate control code is issued. The control code is forwarded to the cellular telephone 312 in the manner described above for the call initiation voice command. In this manner, the voice command issued by the user causes the telephone 312 to go on-hook.

The operation described above for the cellular telephone 312 can also be used to issue commands to control and to communicate with other remote devices, such as fixed wireline phones, personal computers, and so on, connected directly or through, for example, the universal adaptor 200 to the PCN 100. For a remote device such as a computer, digital data is processed in a similar manner, except that it is forwarded from and delivered to the PCN via the port PCN5 without conversion to digital or analog form.

The remote devices described in the embodiments above are shown for illustrative purposes only. One skilled in the art will appreciate that the PCN 100 can be connected to other types of remote devices. For example, the PCN 100 can be connected to a tapedeck for hands-free control of the speed and radio/tapedeck functions in, for example, an automobile. The PCN 100 can also be used to control other functions in an automobile, such as cruise control, temperature settings, or any other function conventionally controlled by hand. Similarly, the PCN 100 can be connected to control a stereo, a CD player, and a television or to program a VCR simply by stating the name, channel, and time of a program to be recorded verbally.

The PCN 100 can also be connected to a remote device in an operating room of a hospital. The remote device can be controlled by voice commands to monitor medical conditions such as heartbeat, blood pressure, temperature, and so on. Vital statistics of a patient can thus be monitored by known sensors, and used to supply information to the doctor on command. Alternately, the information can be delivered to a doctor wearing the earpiece(s), and then used to either automatically initiate medical procedures, or to initiate such medical procedures in response to voice commands of the doctor (e.g., medical procedures such as administering more medicine). In a similar manner, the PCN 100 can also be connected to control exercise equipment in response to verbal commands of the user or to supply audible output to the user in response to PCN monitoring of heart attack conditions, high blood pressure, high cholesterol, and other medical conditions detected by dedicated sensors worn by the user. Information gathered by the PCN from the various sensors can be provided directly to the individual or can be used to initiate automatic functions such as automatically dialing "911" in case of an emergency.

The PCN 100 can also be used in combination with other PCN devices to provide wireless communication between individuals, such as soldiers in the field.

From the examples provided above, it is apparent that the PCN can be used in many different applications to control remote devices and to communicate with third parties via the remote devices.

It will be appreciated by those of ordinary skill in the art that the present invention can be embodied in other specific forms without departing from the spirit or essential characteristics thereof. The presently disclosed embodiments are therefore considered in all respects to be illustrative, and not restrictive. The scope of the invention is indicated by the appended claims, rather than the foregoing description, and all changes that come within the meaning and range of equivalence thereof are intended to be embraced therein.

What is claimed is:

1. A communication system for providing two-way wireless communication between a user and at least one remote device, the communication system comprising:

at least one earpiece worn by the user; and a personal communication device for receiving and transmitting signals over a wireless link to and from said earpiece, wherein said personal communication device includes voice recognition means trainable to a user for recognizing and interpreting voice input of the user, said personal communication device being configured to determine which one of multiple remote devices is connected to the personal communication device to receive said voice input and to transmit appropriate signals to the remote device in response to said voice input.

2. The communication system of claim 1, wherein the personal communication device is connected to a plurality of remote devices at the same time or at different times.

3. The communication system of claim 1, wherein the personal communication device is connected to a single remote device.

4. The communication system of claim 1, further comprising an adapter for adapting the personal communication device to a plurality of different types of remote devices.

5. The communication system of claim 1, wherein the personal communication device transmits voice commands to the remote device to control functions of the remote device.

6. The communication system of claim 1, wherein the personal communication device transmits signals to the remote device which are transmitted by the remote device to a third party.

* * * * *